United States Patent
Thomas

(10) Patent No.: US 6,516,782 B1
(45) Date of Patent: Feb. 11, 2003

(54) SYSTEM AND METHOD FOR CONTROLLING FUEL INJECTIONS

(75) Inventor: Eric D. Thomas, Canton, MI (US)

(73) Assignee: Detroit Diesel Corporation, Detroit, MI (US)

( * ) Notice: Subject to any disclaimer, the term of this patent is extended or adjusted under 35 U.S.C. 154(b) by 46 days.

(21) Appl. No.: 09/321,028

(22) Filed: May 27, 1999

(51) Int. Cl.[7] .......................... F02D 41/40; F02D 41/16
(52) U.S. Cl. .................... 123/436; 123/300; 123/357
(58) Field of Search ............................... 123/299, 300, 123/179.17, 357, 456, 497, 436, 491

(56) References Cited

U.S. PATENT DOCUMENTS

| | | |
|---|---|---|
| 4,217,862 A | 8/1980 | Fort et al. |
| 4,223,654 A | 9/1980 | Wessel et al. |
| 4,329,951 A | 5/1982 | Seilly |
| 4,426,983 A | 1/1984 | Seilly et al. |
| 4,459,955 A | 7/1984 | Adey et al. |
| 4,917,063 A | 4/1990 | Hiraki |
| 5,058,553 A | 10/1991 | Kondo et al. |
| 5,131,371 A | 7/1992 | Wahl et al. |
| 5,133,645 A | 7/1992 | Crowley et al. |
| 5,165,373 A | 11/1992 | Cheng |
| 5,197,438 A | 3/1993 | Yamamoto |
| 5,201,294 A | 4/1993 | Osuka |
| 5,230,613 A | 7/1993 | Hilsbos et al. |
| 5,231,962 A | 8/1993 | Osuka et al. |
| 5,277,156 A | 1/1994 | Osuka et al. |
| 5,313,924 A | 5/1994 | Regueiro |
| 5,402,760 A | 4/1995 | Takeuchi et al. |
| 5,445,128 A | 8/1995 | Letang et al. |
| 5,477,827 A | 12/1995 | Weisman, II et al. |
| 5,483,927 A | 1/1996 | Letang et al. |
| 5,485,820 A | 1/1996 | Iwaszkiewicz |
| 5,492,099 A | 2/1996 | Maddock |
| 5,507,266 A | 4/1996 | Wright et al. |
| 5,605,134 A | 2/1997 | Martin |
| 5,615,654 A | 4/1997 | Weisman, II et al. |
| 5,647,317 A | 7/1997 | Weisman, II et al. |
| 5,694,902 A | 12/1997 | Miwa et al. |
| 5,771,861 A | 6/1998 | Musser et al. |
| 5,771,865 A | 6/1998 | Ishida |
| 6,016,791 A | 1/2000 | Thomas et al. |

*Primary Examiner*—Carl S. Miller
(74) *Attorney, Agent, or Firm*—Brooks & Kushman, P.C.

(57) ABSTRACT

A method for controlling fuel delivery from a fuel injector includes determining a first desired engine torque output; determining engine speed; determining a first quantity of fuel to be delivered by the fuel injector based on the first desired engine torque output and the engine speed; determining an injection pressure; and determining a first amount of time for energizing the fuel injector in order to deliver the first quantity of fuel based on the injection pressure. For a system capable of split injection, the method further includes determining a second desired engine torque output; determining a second quantity of fuel to be delivered by the fuel injector based on the second desired engine torque output and the engine speed; and determining a second amount of time for energizing the fuel injector in order to deliver the second quantity of fuel. The method and system of the invention provide more precise control of fuel delivery compared with prior systems and methods.

27 Claims, 2 Drawing Sheets a plurality of fuel injectors in communication with the fuel rail for injecting fuel into a plurality of cylinders of an internal combustion engine. Each of the fuel injectors has an electronic control valve or solenoid for controlling fuel injection into a particular cylinder. An electronic control unit, or controller, is used to control the electronic control valves, as well as other aspects of the fuel injection system. The controller may include volatile and non-volatile memory, input and output driver circuitry, and a processor capable of executing one or more stored instruction sets. In operation, the controller determines an excitation or energizing duration for each control valve corresponding to current engine conditions. Energizing of a particular control valve causes the valve to open, which allows fuel injection to occur. However, imprecise determination of energizing durations may result in operating problems such as engine noise and excessive engine emissions.

SYSTEM AND METHOD FOR CONTROLLING FUEL INJECTIONS

TECHNICAL FIELD

The invention relates to a system and method for controlling fuel injection of fuel injectors in an internal combustion engine.

BACKGROUND ART

A prior fuel injection system includes a common fuel rail and a plurality of fuel injectors in communication with the fuel rail for injecting fuel into a plurality of cylinders of an internal combustion engine. Each of the fuel injectors has an electronic control valve or solenoid for controlling fuel injection into a particular cylinder. An electronic control unit, or controller, is used to control the electronic control valves, as well as other aspects of the fuel injection system. The controller may include volatile and non-volatile memory, input and output driver circuitry, and a processor capable of executing one or more stored instruction sets. In operation, the controller determines an excitation or energizing duration for each control valve corresponding to current engine conditions. Energizing of a particular control valve causes the valve to open, which allows fuel injection to occur. However, imprecise determination of energizing durations may result in operating problems such as engine noise and excessive engine emissions.

A prior method for determining energizing durations by a controller involves determining a desired injection pressure and a raw injection duration from two separate, but interdependent, look-up tables that each reference desired engine torque and engine speed. The raw injection duration is not based on time units, however, but rather is based on angular displacement of the engine crankshaft measured in degrees. The raw injection duration is then adjusted to establish a final injection duration based on injection pressure error, which is a function of desired injection pressure and observed or actual injection pressure. Finally, the final injection duration is converted from degrees to time to establish an energizing duration, and a corresponding control signal is sent to a particular fuel injector.

Because this method involves interdependent look-up tables for determining desired injection pressure and raw injection duration, calibration of the look-up tables and associated controller is difficult and time-consuming. Furthermore, desired injection pressure values, which are used to control a fuel pump, cannot be independently varied so as to optimally adapt injection pressure to variable operating conditions such as air temperature.

Several methods have been proposed to enhance fuel injection capabilities. One such method is known as split injection. Split injection consists of a first injection, called the pilot injection, followed by a delay, and then a second injection, referred to as the main injection. When performing split injection, precise determination of energizing durations for both the pilot injection and the main injection is essential. Many times, operating conditions at which split injection may be performed are restricted to lower engine speeds due to difficulties in establishing precise energizing durations.

A method for determining pilot and main energizing durations is similar to the method previously described. The method involves determining a desired injection pressure based on a desired engine torque output and engine speed, determining a raw pilot injection duration based on a desired pilot engine torque output and engine speed, and determining a raw main injection duration based on a desired main engine torque output and engine speed. As in the above method, the raw injection durations are not based on time units, but rather are represented in degrees of rotation of the crankshaft. Furthermore, the desired injection pressure and the raw injection durations are determined in parallel from separate, but interdependent, look-up tables. The raw pilot injection duration and the raw main injection duration are then adjusted to establish a final pilot injection duration and a final main injection duration, respectively, based on injection pressure error. Next, the final pilot injection duration and the final main injection duration are converted from degrees to time to establish a pilot energizing duration and a main energizing duration, respectively, and corresponding control signals are sent to a particular fuel injector.

DISCLOSURE OF THE INVENTION

It is therefore an object of the invention to provide a method and system for controlling fuel delivery from a fuel injector based on energizing durations that are more precisely determined as compared with prior methods and systems.

Another object of the invention is to provide a method and system for determining energizing durations in time units independently of angular measurements associated with an engine crankshaft.

Another object of the invention is to provide a method and system for determining energizing durations based on desired fuel quantities per injection cycle, mapped against engine speed and desired torque, and actual or observed fuel pressure.

A more specific object of the invention is to provide a method and system for controlling fuel pressure based on desired injection pressure, wherein the desired injection pressure is determined independently of the desired fuel quantities per injection cycle. Preferably, the desired injection pressure can be adjusted independently of the desired fuel quantities per injection cycle in order to account for dynamic engine operating parameters.

Under the invention, a method for controlling fuel delivery from a fuel injector includes determining a first desired engine torque output; determining engine speed; determining a first quantity of fuel to be delivered by the fuel injector based on the first desired engine torque output and the engine speed; determining an injection pressure; and determining a first amount of time for energizing the fuel injector in order to deliver the first quantity of fuel based on the injection pressure.

According to a feature of the invention, the method may also include determining a desired injection pressure independently of determining the first amount of time, and controlling a fuel pump system for supplying fuel to the fuel injector based on the desired injection pressure. Preferably, the desired injection pressure may be altered independently of the first amount of time based on dynamic engine operating parameters. As a result, the fuel pump system may be effectively controlled to optimize fuel pressure to thereby optimize engine operation.

For a system capable of split injection, the method further includes determining a second desired engine torque output; determining a second quantity of fuel to be delivered by the fuel injector based on the second desired engine torque output and the engine speed; and determining a second amount of time for energizing the fuel injector in order to deliver the second quantity of fuel.

A system is also provided for controlling fuel delivery from a fuel injector having an electronic control valve, wherein the fuel injector is in communication with a fuel rail. The system comprises an accelerator pedal sensor for sensing pedal position, a crankshaft sensor for sensing rotational speed of the crankshaft, and a fuel pressure sensor for measuring fuel pressure in the fuel rail. The system further includes a controller in communication with the accelerator pedal sensor, the crankshaft sensor, the fuel pressure sensor and the electronic control valve. The controller includes instructions for determining a first desired engine torque output based on the pedal position, instructions for determining engine speed based on the rotational speed of the crankshaft, instructions for determining a first quantity of fuel to be delivered by the fuel injector based on the first desired engine torque output and the engine speed, and instructions for determining a first amount of time for energizing the electronic control valve in order for the fuel injector to deliver the first quantity of fuel. Furthermore, the controller includes instructions for generating an output signal for the electronic control valve corresponding to the first amount of time.

The above objects and other objects, features and advantages of the invention are readily apparent from the following detailed description of the best modes for carrying out the invention when taken in conjunction with the accompanying drawings.

BEST MODE FOR CARRYING OUT THE INVENTION

Figure 1:
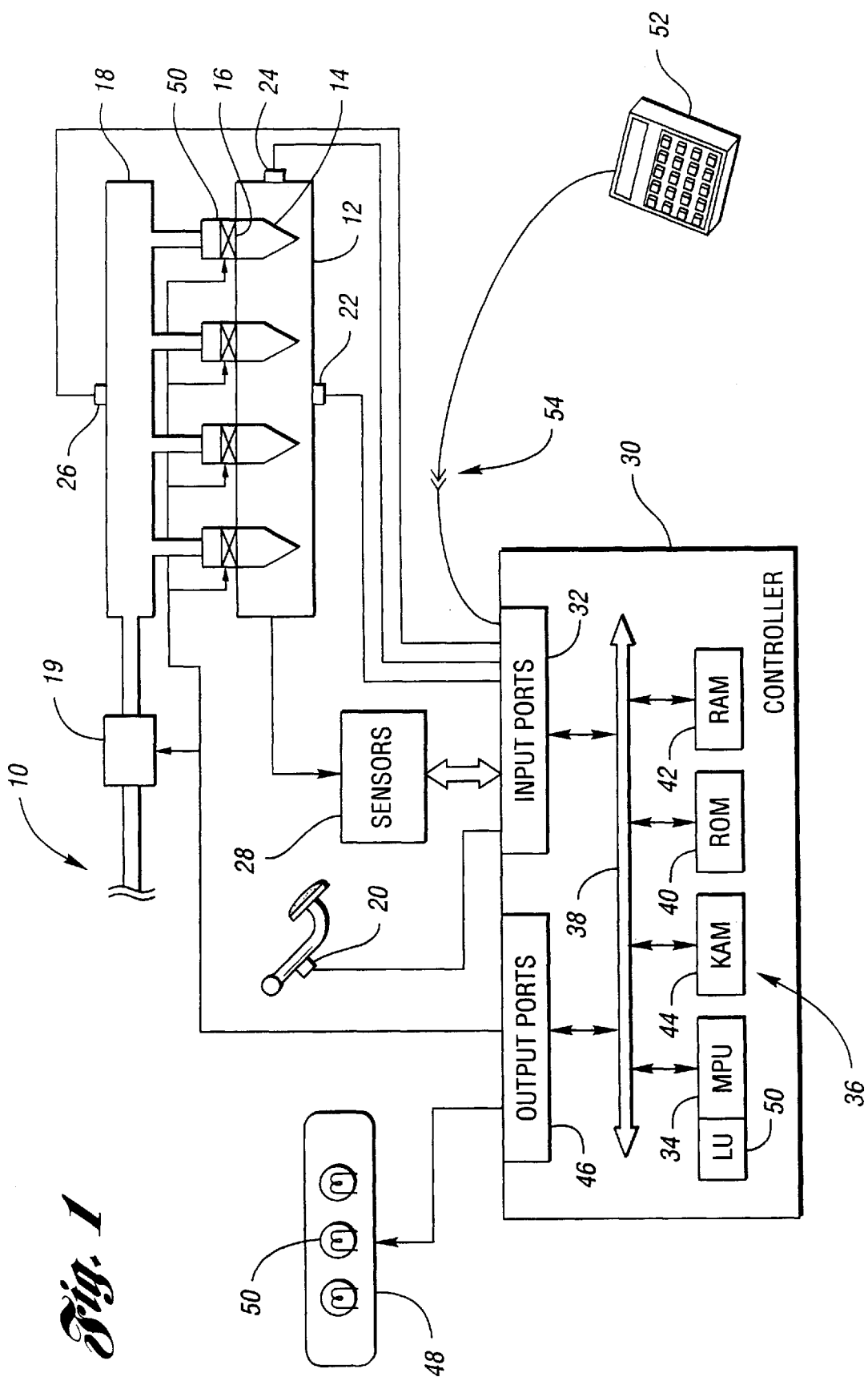
FIG. 1 is a schematic diagram of one embodiment of a system for controlling fuel injection according to the invention.

Referring now to FIG. 1, a system for controlling fuel delivery according to the present invention is shown. The system, generally indicated by reference numeral 10, includes an engine 12 having a plurality of cylinders, each of which is fed by fuel injectors 14. In a preferred embodiment, engine 12 is a compression-ignition internal combustion engine, such as a four, six, eight, twelve, sixteen, twenty or twenty-four-cylinder diesel engine. Each of the fuel injectors 14 preferably has an electronic control valve 16 (such as a solenoid, for example) for controlling injection into a particular cylinder. The fuel injectors 14 receive pressurized fuel from a common rail 18, which is connected to one or more high or low pressure fuel pumps, such as fuel pump 19, as is well known in the art. Alternatively, embodiments of the present invention may employ a plurality of unit pumps (not shown), each pump supplying fuel to one of the injectors 14.

The system 10 further includes an accelerator pedal sensor 20 for sensing pedal or throttle position, a temperature sensor 22 for sensing engine temperature, a crankshaft sensor 24 for sensing rotational speed of the crankshaft (not shown), and a fuel pressure sensor 26 for sensing fuel pressure in the rail 18. The system 10 may also include various other sensors 28 for generating signals indicative of corresponding operating conditions or parameters of engine 12, a vehicle transmission (not shown), and/or other vehicular components. For example, the sensors 28 may generate signals corresponding to such parameters as battery voltage, fuel temperature, ambient air temperature, and ambient air pressure. The sensors 20–28 are in electrical communication with a controller 30 via input ports 32. The controller 30 preferably includes a microprocessor 34 in communication with various computer readable storage media 36 via data and control bus 38. The computer readable storage media 36 may include any of a number of known devices which function as a read-only memory (ROM) 40, random access memory (RAM) 42, keep-alive memory (KAM) 44, and the like. The computer readable storage media 30 may be implemented by any of a number of known physical devices capable of storing data representing instructions executable via a computer such as controller 30. Known devices may include, but are not limited to, PROM, EPROM, EEPROM, flash memory, and the like in addition to magnetic, optical, and combination media capable of temporary or permanent data storage.

The computer readable storage media 36 include data representing program instructions (software), calibrations, operating variables and the like that are used in conjunction with associated hardware to effect control of various systems and subsystems of the vehicle, such as the engine 12, vehicle transmission, and the like. With respect to fuel delivery, the controller 30 receives signals from sensors 20–28 via input ports 32, and generates output signals that may be provided to various actuators and/or components, such as the electronic control valves 16 and pump 19, via output ports 46. Signals may also be provided to a display device 48, which may include various indicators such as lights 50 to communicate information relative to system operation to the operator of the vehicle. Of course, alphanumeric, audio, video, or other displays or indicators may be utilized if desired.

A data, diagnostics, and programming interface 52 may also be selectively connected to controller 30 via a plug 54 to exchange various information therebetween. Interface 52 may be used to change values within the computer readable storage media 36, such as configuration settings, calibration variables including adjustment factor look-up tables, control logic, temperature thresholds for enabling or disabling split injection, and the like.

In operation, controller 30 receives signals from sensors 20–28 and executes or implements control logic embedded in hardware and/or software to control fuel delivery to the engine 12 by controlling fuel pressure in the rail 18 and actuation of the electronic control valves 16. Furthermore, the controller 22 preferably implements control logic to determine the injection mode, such as split injection or single injection, depending on user preferences and/or current operating conditions. Split injection involves a first injection, known as a pilot injection, followed by a delay, and then a second injection, known as a main injection. Controller 22 is preferably capable of smooth transitions between injection modes under various operating conditions. The control logic is preferably implemented by the microprocessor 34 as described below in further detail. However, various alternative hardware and/or software may be used to implement the control logic without departing from the spirit or scope of the invention. In a preferred embodiment, the controller 30 is a Detroit Diesel Electronic Controller (DDEC) available from Detroit Diesel Corporation, Detroit, Mich.

Figure 2:
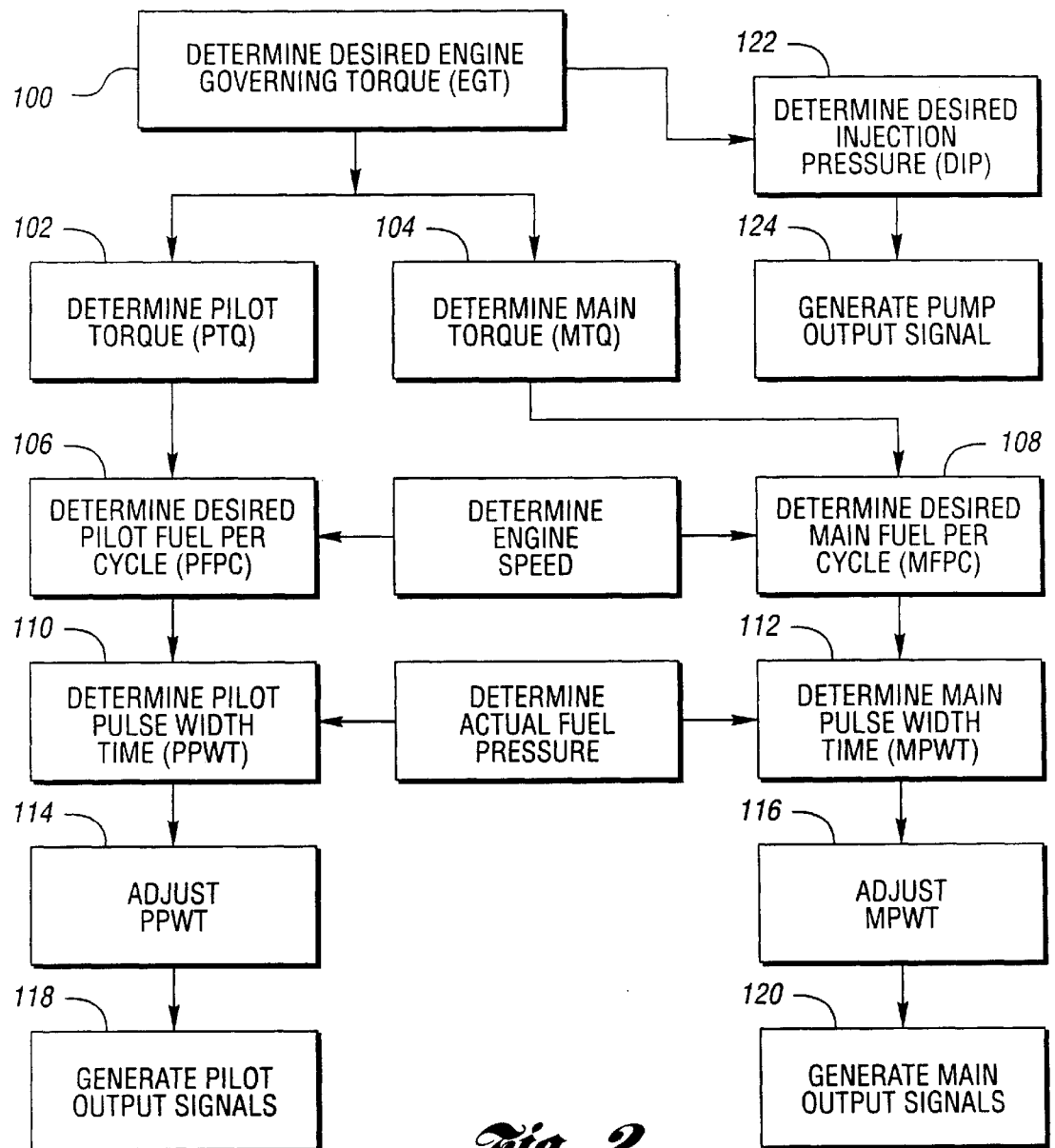
FIG. 2 is a flow chart illustrating operation of a system or method according to the present invention for controlling fuel injection, wherein the system or method includes controlling a fuel pump system based on desired injection pressure.

FIG. 2 is a flow chart illustrating operation of a method or system, such as system 10, for controlling fuel delivery according to the present invention. As will be appreciated by one of ordinary skill in the art, the flow chart represents control logic which may be effected or implemented by hardware, software, or a combination of hardware and software. The various functions are preferably implemented by a programmed microprocessor such as included in the DDEC controller. Alternatively, one or more of the functions may be implemented by dedicated electric, electronic, or integrated circuits. As will also be appreciated, the control logic may be implemented using any one of a number of known programming and processing techniques or strategies and is not limited to the order or sequence illustrated here for convenience only. For example, interrupt or event driven processing is typically employed in real-time control applications, such as control of a vehicle engine or transmission. Likewise, parallel processing or multitasking systems and methods may be used to accomplish the objects, features, and advantages of the present invention. The present invention is independent of the particular programming language, operating system, or processor used to implement the control logic illustrated.

At step 100 of FIG. 2, a desired engine governing torque (EGT) is determined based on various operating conditions such as throttle position and/or transmission gear ratio. Alternatively, EGT may be determined by a variable speed governor. For a fuel injection system capable of split injection, EGT is divided into a pilot torque (PTQ), as shown at step 102, and a main torque (MTQ), as shown at step 104. The value of PTQ is the lesser of the EGT and a pilot torque limiting value, not shown. The value of MTQ is simply EGT less PTQ. If split injection is disabled, then PTQ equals EGT, and MTQ equals zero.

Next, a desired quantity of fuel to be delivered during the pilot injection, or pilot fuel per cycle (PFPC), and a desired quantity of fuel to be delivered during the main injection, or main fuel per cycle (MFPC), are determined at steps 106 and 108, respectively. The PFPC and MFPC are determined based on PTQ and MTQ, respectively, and other engine operating parameters, such as engine speed measured in revolutions per minute (RPM) of the crankshaft. PFPC and MFPC are preferably found in two separate look-up tables that reference PTQ and MTQ, respectively, and engine RPM.

Next, pulse width times are determined. Each pulse width time is related to a particular energizing duration, which is the amount of time necessary to energize a particular electronic control valve 16, shown in FIG. 1, in order to deliver a particular desired quantity of fuel. Unlike prior control systems, the pulse width times are determined in time units and are not dependent on angular displacement of the crankshaft. For a fuel injection system capable of split injection, two such pulse width times are determined, subject to adjustment by other functions and/or calibration techniques described below in further detail. These pulse widths include a pilot pulse width time (PPWT), which is determined at step 110 in FIG. 2, and a main pulse width time (MPWT), which is determined at step 112. The PPWT relates to the amount of time required to energize a particular electronic control valve 16 in order to deliver the PFPC during the pilot injection, and the MPWT relates to the amount of time required to energize the particular electronic control valve 16 in order to deliver the MFPC during the main injection. The PPWT and the MPWT are determined based on the PFPC and the MFPC, respectively, and other engine operating parameters. Such parameters may include observed or actual fuel pressure in, for example, rail 18 (shown in FIG. 1). The actual fuel pressure is also referred to as injection pressure. Preferably, the PPWT and the MPWT are found in two separate look-up tables that reference PFPC and MFPC, respectively, and actual fuel pressure.

Pilot and main injections are controlled, such as by the controller 30 shown in FIG. 1, based on the PPWT and the MPWT. Control logic may be applied to the PPWT and/or the MPWT to adjust these values, as represented in FIG. 2 at steps 114 and 116, respectively, based on engine operating parameters such as fuel pressure, engine temperature, ambient air temperature and ambient air pressure. Next, pilot output signals and main output signals are generated at steps 118 and 120, respectively, based on the PPWT and the MPWT, respectively. The output signals represent energizing durations and are used to energize a particular electronic control valve 16, show in FIG. 1, in order to deliver the PFPC during the pilot injection, and the MFPC during the main injection. The output signals may also be generated based on additional factors such as actuation latency of the electronic control valves 16, and delay in lifting of associated spray tip needles. Furthermore, an inter-pulse gap between the pilot injection and the main injection is also determined. Additional details regarding fuel injection timing may be found in application Ser. No. 09/156,246, which is assigned to the assignee of the present invention and is hereby incorporated by reference. It should be noted that although the time periods (PPWT, MPWT and related energizing durations) associated with the pilot and main injections are determined in time units, initiation of these time periods is still preferably dependent on crankshaft orientation so that the injections may be completed at the appropriate time relative to piston position. Furthermore, for a fuel injection system capable of only single injection, obviously only a single fuel per injection cycle value, a single pulse width time, and a single energizing duration are determined.

Because pulse width times are determined in time units under the present invention, the pulse width times are more precise than prior pulse widths that are based on angular displacement of the engine crankshaft when the injection pressure is provided by a common rail. As a result, fuel injection may be precisely controlled so as to optimize engine operation. Furthermore, because desired quantities of fuel per injection cycle are determined independently of angular displacement of the engine crankshaft, estimated fuel consumption may be determined more precisely than prior methods.

Another aspect of controlling fuel delivery involves controlling fuel pressure. This is preferably accomplished by controlling a fuel pump system, such as fuel pump 19 shown in FIG. 1, based on desired injection pressure. At step 122 of FIG. 2, a desired injection pressure (DIP) is preferably determined independently of PPWT and MPWT based on EGT and other engine operating parameters, such as engine RPM. For a common rail system, the DIP is the desired fuel pressure in the rail. Preferably, the DIP is located in a look-up table referenced by EGT and engine RPM. Furthermore, the look-up table is preferably based on steady-state engine operation. At step 124, a pump output signal is generated for controlling the fuel pump 19, or other fuel pump system, and the pump output signal is based on the difference between the DIP and observed or actual fuel pressure. Additional details regarding controlling fuel pressure based on desired injection pressure may be found in U.S. patent application Ser. No. 08/867,695, which is assigned to the assignee of the present invention and is hereby incorporated by reference.

Advantageously, because the DIP is preferably determined independently of the PPWT and the MPWT, the DIP may be adjusted independently to account for dynamic engine operating parameters such as engine acceleration mode, engine temperature, boost pressure associated with a turbo-charger, ambient air temperature, and ambient air pressure. For example, during a rapid acceleration mode, the air to fuel ratio may be too low (not enough air) to achieve optimal engine efficiency. Consequently, it may be desirable to lower the DIP in order to lower the actual injection pressure. As another example, for cold starting conditions, it may be desirable to again lower the DIP in order to lower the actual injection pressure so as to avoid excessive lowering of cylinder pressure caused by fuel evaporation.

Figure 3:
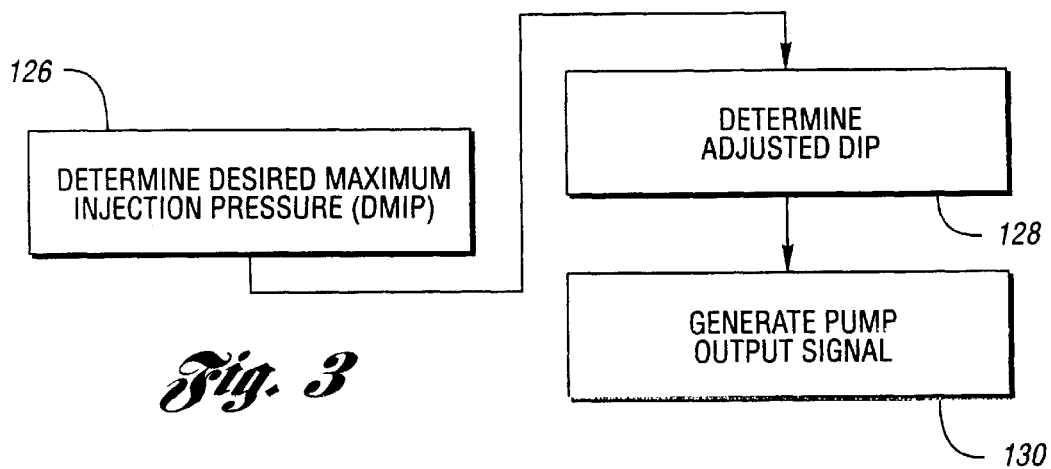
FIG. 3 is a flow chart illustrating a method according to the present invention for altering desired injection pressure based on dynamic engine operating parameters.

One method for adjusting the DIP is shown in FIG. 3. At step 126, a desired maximum injection pressure (DMIP) is determined based on EGT and other engine operating parameters, such as engine RPM. For a common rail system, the DMIP is the desired maximum fuel pressure in the rail. At step 128, a suitable adjustment factor is then applied to the DIP to determine an adjusted DIP that is limited by the DMIP and is based on dynamic engine operating parameters. For example, the adjustment factor may be used to interpolate between the DIP and the DMIP in order to determine the adjusted DIP. For certain engine operating parameters, such as high engine temperature, the adjustment factor may also trigger a discrete value for the adjusted DIP for engine protection purposes, failure mode recovery, and the like. Alternatively, the DIP may be adjusted in any suitable manner to account for dynamic engine operating parameters. Next, a pump output signal is generated at step 130 for controlling the fuel pump 19, or other fuel pump system, and the pump output signal is based on the difference between the adjusted DIP and the actual fuel pressure.

Because desired injection pressures can be adjusted based on dynamic engine operating parameters, control of a fuel pump system can be optimized so as to provide optimal fuel pressure. Consequently, engine performance and efficiency are improved, and exhaust emissions are reduced compared with prior systems and methods.

While embodiments of the invention have been illustrated and described, it is not intended that these embodiments illustrate and describe all possible forms of the invention. Rather, the words used in the specification are words of description rather than limitation, and that various changes may be made without departing from the spirit and scope of the invention.

What is claimed is:

1. A method for controlling fuel delivery from a fuel injector, the method comprising;
    determining a first desired engine torque output;
    determining engine speed;
    determining a first quantity of fuel to be delivered by the fuel injector based on the first desired engine torque output and the engine speed;
    determining an injection pressure; and
    determining a first amount of time for energizing the fuel injector in order to deliver the first quantity of fuel based on the injection pressure, wherein determining a first amount of time is performed independently of angular measurements associated with an engine crankshaft.

2. The method of claim 1 wherein determining an injection pressure comprises determining fuel pressure in a fuel rail connected to the fuel injector.

3. The method of claim 2 further comprising determining a desired injection pressure independently of determining the first amount of time, and controlling a fuel pump system for supplying fuel to the fuel injector based on the desired injection pressure.

4. The method of claim 3 further comprising determining a desired engine governing torque, and wherein determining a desired injection pressure comprises determining the desired injection pressure based on the desired engine governing torque and the engine speed.

5. The method of claim 4 wherein the first desired engine torque output is the same as the desired engine governing torque.

6. The method of claim 5 further comprising determining a desired acceleration mode, and modifying the desired injection pressure based on the desired acceleration mode.

7. The method of claim 5 further comprising determining an engine temperature, and modifying the desired injection pressure based on the engine temperature.

8. The method of claim 1 further comprising determining a second desired engine torque output, determining a second quantity of fuel to be delivered by the fuel injector based on the second desired engine torque output and the engine speed, and determining a second amount of time for energizing the fuel injector in order to deliver the second quantity of fuel.

9. A method for controlling fuel delivery to a cylinder of an internal combustion engine, the engine having a fuel injector in fluid communication with the cylinder, and a fuel rail in fluid communication with the fuel injector, the method comprising;
    determining a desired pilot torque output and a desired main torque output of the engine;
    determining engine speed;
    determining a pilot quantity of fuel to be delivered by the fuel injector using a first look-up table that references the desired pilot torque output and the engine speed;
    determining a main quantity of fuel to be delivered by the fuel injector using a second look-up table that references the desired main torque output and the engine speed;
    determining fuel pressure in the fuel rail;
    determining a pilot amount of time for energizing the fuel injector in order to deliver the pilot quantity of fuel using a third look-up table that references the pilot quantity of fuel and the fuel pressure in the fuel rail; and
    determining a main amount of time for energizing the fuel injector in order to deliver the main quantity of fuel using a fourth look-up table that references the main quantity of fuel and the fuel pressure in the fuel rail;
    wherein determining the pilot amount of time and determining the main amount of time are performed independently of angular measurements associated with an engine crankshaft.

10. A system for controlling fuel delivery from a fuel injector having an electronic control valve, the fuel injector being in communication with a fuel rail, the system comprising:
    a crankshaft sensor for sensing rotational speed of the crankshaft;
    a fuel pressure sensor for measuring fuel pressure in the fuel rail;
    a microprocessor in communication with the crankshaft sensor, the fuel pressure sensor and the electronic control valve, the microprocessor including instructions for determining a first desired engine torque output, instructions for determining engine speed based on the rotational speed of the crankshaft, instructions for determining a first quantity of fuel to be delivered by the fuel injector based on the first desired engine torque output and the engine speed, instructions for determining fuel pressure in the fuel rail using the fuel pressure sensor, instructions for determining a first amount of time for energizing the electronic control valve in order for the fuel injector to deliver the first quantity of fuel based on the fuel pressure and the first quantity of fuel, and instructions for generating an output signal for the electronic control valve corresponding to the first amount of time, wherein the instructions for determining a first amount of time include instructions for determining the first amount of time independently of angular measurements associated with an engine crankshaft.

11. A computer readable storage medium having information stored thereon representing instructions executable by an engine controller to control fuel delivery from a fuel injector having an electronic control valve, the fuel injector being in communication with a fuel rail, the computer readable storage medium comprising:
   instructions for determining a first desired engine torque output;
   instructions for determining engine speed;
   instructions for determining a first quantity of fuel to be delivered by the fuel injector based on the first desired engine torque output and the engine speed;
   instructions for determining fuel pressure in the fuel rail; and
   instructions for determining a first amount of time for energizing the control valve in order for the fuel injector to deliver the first quantity of fuel based on the fuel pressure in the fuel rail, wherein the instructions for determining a first amount of time include instructions for determining the first amount of time independently of angular measurements associated with an engine crankshaft.

12. The computer readable storage medium of claim 11 further comprising instructions for determining a desired injection pressure independently of determining the first amount of time, and instructions for controlling a fuel pump system for supplying fuel to the fuel rail based on the desired injection pressure.

13. The computer readable storage medium of claim 12 further comprising instructions for determining a desired engine governing torque, and wherein the instructions for determining a desired injection pressure comprise instructions for determining the desired injection pressure based on the desired engine governing torque and the engine. speed.

14. The computer readable storage medium of claim 13 further comprising instructions for establishing a desired acceleration mode, and instructions for modifying the desired injection pressure based on the desired acceleration mode.

15. The computer readable storage medium of claim 13 further comprising instructions for determining an engine temperature, and instructions for modifying the desired injection pressure based on the engine temperature.

16. The computer readable storage medium of claim 11 further comprising instructions for determining a second desired engine torque output, instructions for determining a second quantity of fuel to be delivered by the fuel injector based on the second desired engine torque output and the engine speed, and instructions for determining a second amount of time for energizing the control valve in order for the fuel injector to deliver the second quantity of fuel.

17. The method of claim 1 wherein determining a first quantity of fuel includes determining the first quantity of fuel using a first look-up table that references the first desired engine torque output and the engine speed.

18. The method of claim 17 wherein determining the first amount of time includes determining the first amount of time using a second look-up table that references the first quantity of fuel and the injection pressure.

19. The method of claim 4 wherein determining an injection pressure comprises determining rail pressure in a fuel rail connected to the fuel injector, and wherein the method further includes generating an output signal for controlling the fuel pump system based on the difference between the desired injection pressure and the rail pressure.

20. The system of claim 10 wherein the microprocessor further includes instructions for determining a desired injection pressure independently of determining the first amount of time, and instructions for controlling a fuel pump system for supplying fuel to the fuel rail based on the desired injection pressure.

21. The system of claim 20 wherein the microprocessor further comprises instructions for determining a desired engine governing torque, and wherein the instructions for determining a desired injection pressure comprise instructions for determining the desired injection pressure based on the desired engine governing torque and the engine speed.

22. The system of claim 21 wherein the microprocessor further comprises instructions for establishing a desired acceleration mode, and instructions for modifying the desired injection pressure based on the desired acceleration mode.

23. The system of claim 21 wherein the microprocessor further comprises instructions for determining an engine temperature, and instructions for modifying the desired injection pressure based on the engine temperature.

24. The system of claim 10 wherein the instructions for determining a first quantity of fuel include instructions for determining the first quantity of fuel using a first look-up table that references the first desired engine torque output and the engine speed.

25. The system of claim 24 wherein the instructions for determining a first amount of time include instructions for determining the first amount of time using a second look-up table that references the first quantity of fuel and the injection pressure.

26. The computer readable storage medium of claim 11 wherein the instructions for determining a first quantity of fuel include instructions for determining the first quantity of fuel using a first look-up table that references the first desired engine torque output and the engine speed.

27. The computer readable storage medium of claim 26 wherein the instructions for determining a first amount of time include instructions for determining the first amount of time using a second look-up table that references the first quantity of fuel and the injection pressure.

* * * * *

UNITED STATES PATENT AND TRADEMARK OFFICE
CERTIFICATE OF CORRECTION

PATENT NO.    : 6,516,782 B1
DATED         : February 11, 2003
INVENTOR(S)   : Eric D. Thomas It is certified that error appears in the above-identified patent and that said Letters Patent is hereby corrected as shown below:

<u>Column 9,</u>
Line 51, after "engine" and before "speed" delete the period "."

Signed and Sealed this

Fifth Day of August, 2003

JAMES E. ROGAN
*Director of the United States Patent and Trademark Office*